US010101831B1

(12) United States Patent
Dand

(10) Patent No.: US 10,101,831 B1
(45) Date of Patent: Oct. 16, 2018

(54) TECHNIQUES FOR SHARING DATA BETWEEN DEVICES WITH VARYING DISPLAY CHARACTERISTICS

(71) Applicant: Amazon Technologies, Inc., Reno, NV (US)

(72) Inventor: Dhairya Dand, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/825,106

(22) Filed: Aug. 12, 2015

(51) Int. Cl.
G06F 3/14 (2006.01)
G06F 3/041 (2006.01)
H04N 5/232 (2006.01)

(52) U.S. Cl.
CPC ............ *G06F 3/041* (2013.01); *G06F 3/1423* (2013.01); *H04N 5/23229* (2013.01)

(58) Field of Classification Search
None
See application file for complete search history.

(56) References Cited

U.S. PATENT DOCUMENTS

| 2007/0146347 | A1 | 6/2007 | Rosenberg |
| 2008/0209312 | A1 | 8/2008 | Ardiri |
| 2009/0140986 | A1 | 6/2009 | Karkkainen et al. |
| 2009/0280824 | A1 | 11/2009 | Rautianen |
| 2011/0083111 | A1 | 4/2011 | Forutanpour et al. |
| 2011/0239114 | A1* | 9/2011 | Falkenburg ......... G06F 3/04883 715/702 |
| 2014/0071069 | A1* | 3/2014 | Anderson ............... A63F 13/06 345/173 |
| 2014/0173530 | A1 | 6/2014 | Meguich Havilo et al. |
| 2014/0295763 | A1 | 10/2014 | Lee et al. |
| 2014/0320542 | A1* | 10/2014 | Naruse .................. G06F 3/1454 345/690 |
| 2015/0229697 | A1* | 8/2015 | Grobelny ............... H04L 67/06 715/748 |
| 2016/0259797 | A1 | 9/2016 | Lewis et al. |

FOREIGN PATENT DOCUMENTS

WO    WO 2013/071140    5/2013

OTHER PUBLICATIONS

Invitation to Pay Additional Fees with Partial Search Report by the International Searching Authority for PCT Application No. PCT/US2016/046631, dated Oct. 28, 2016, 7 pages.

* cited by examiner

*Primary Examiner* — Joseph Haley
(74) *Attorney, Agent, or Firm* — Polsinelli LLP

(57) ABSTRACT

The subject technology provides embodiments for flinging digital content between proximate computing devices. The computing devices may each have varying display characteristics depending on the specifications of the device. A first computing device may display an interface including representations of digital items. A user may perform a flinging gesture on a touch-sensitive display screen on the first computing device, which selects at least one digital item for sharing with another proximate computing device in a direction of the flinging gesture. Some embodiments further provide for capturing multiple representations of digital items, which may then be stored as snapshots. A given snapshot, including such representations of digital items, can then be shared to one or more other proximate computing devices.

20 Claims, 17 Drawing Sheets

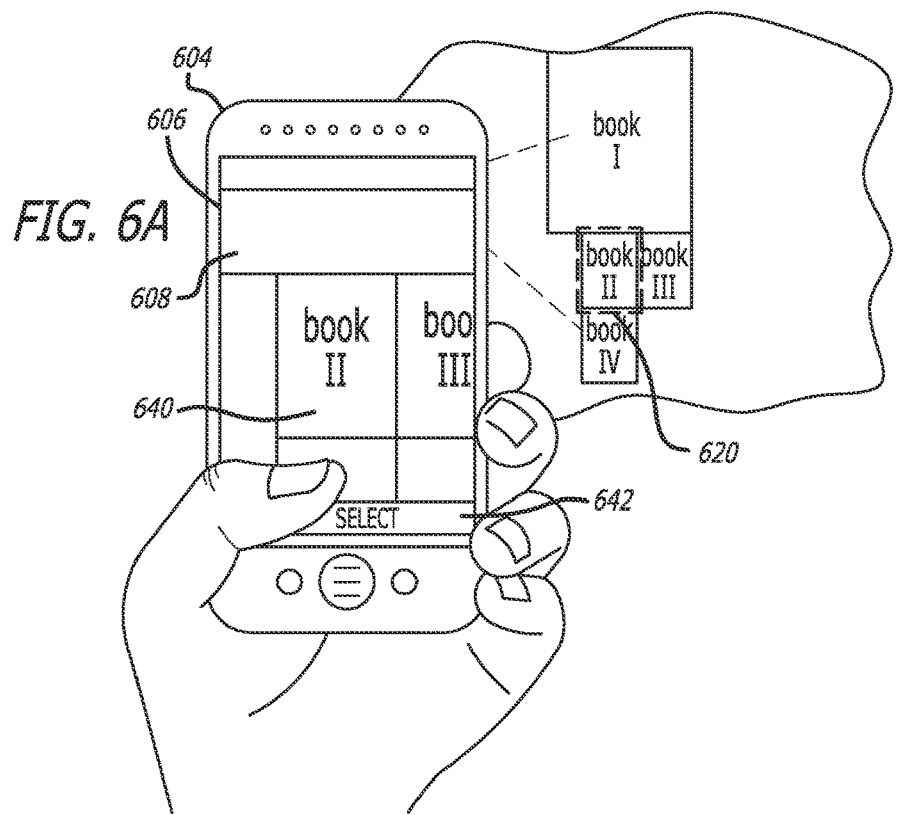
FIG. 6A
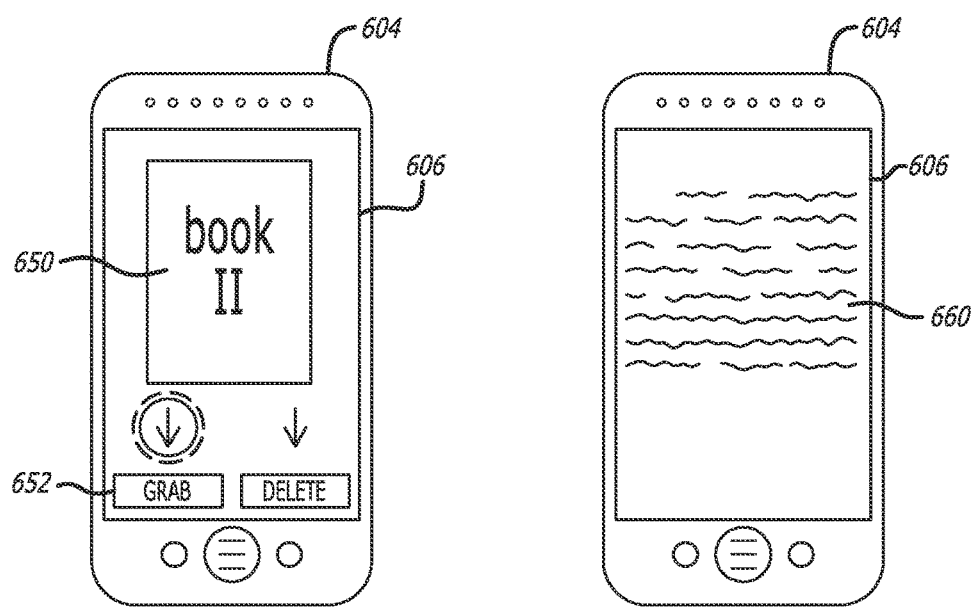
FIG. 6B
FIG. 6C

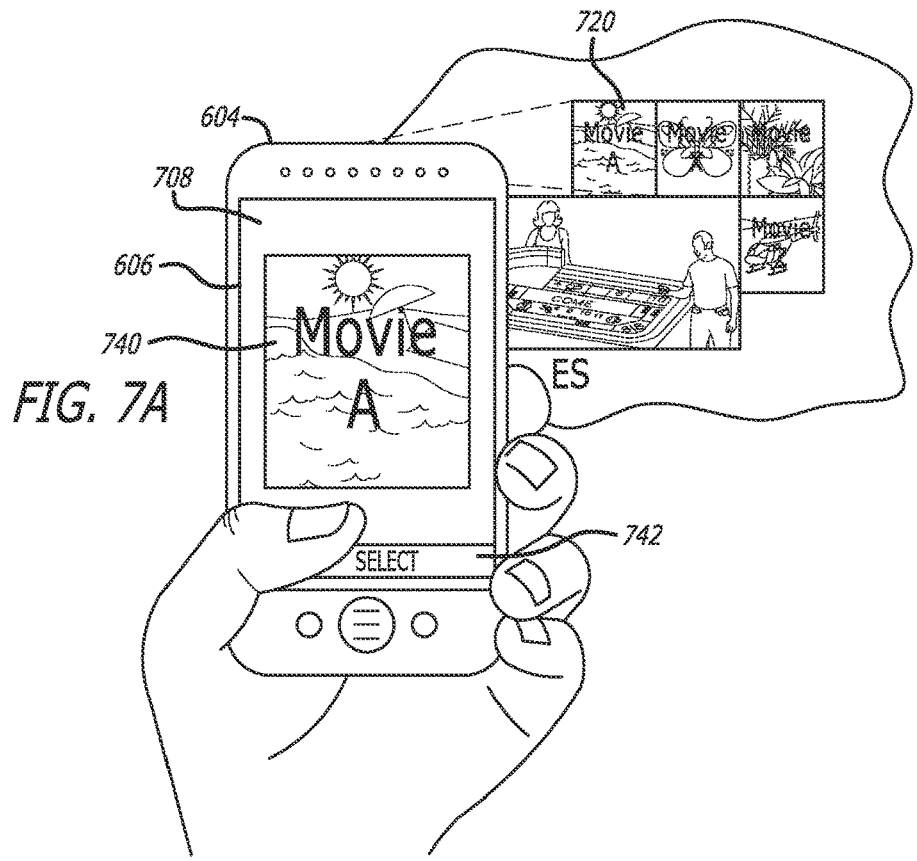
FIG. 7A
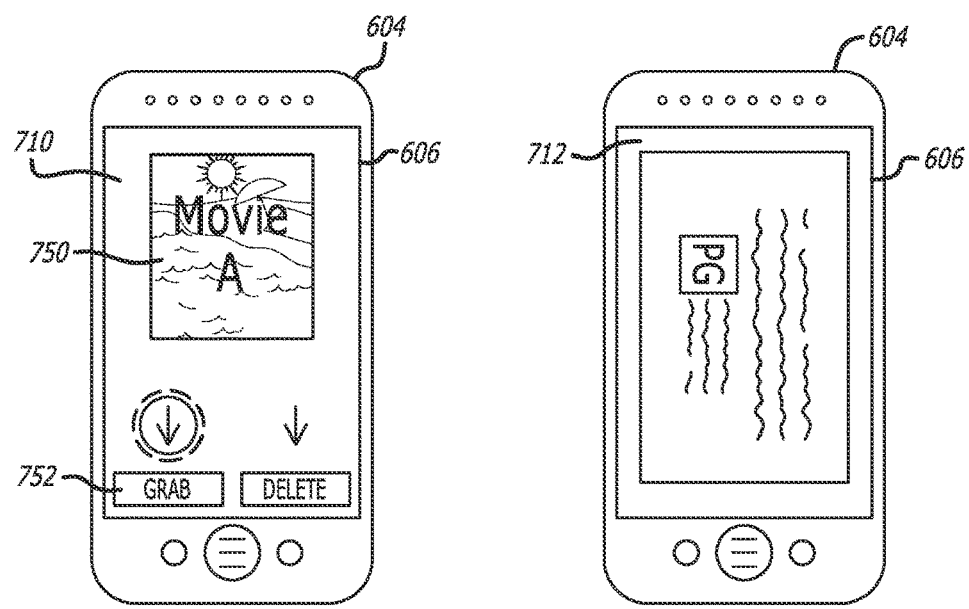
FIG. 7B
FIG. 7C

TECHNIQUES FOR SHARING DATA BETWEEN DEVICES WITH VARYING DISPLAY CHARACTERISTICS

BACKGROUND

Recent years have seen drastic increases in the use of portable computing devices, such as smart phones and tablet computers. Today's consumers are utilizing such devices for a wide variety of different purposes, such as to access and search the Internet, purchase products and services, capture and/or send digital images, compose electronic mail (email) messages, make telephone calls and the like. Many of today's portable devices utilize a touch screen to receive input from users of the device. This input often takes the form of gestures made by the user's hand or fingers made while touching the screen of the device. For example, a user may make sliding motions to flip between pages or applications, pinching motions to cause the screen to zoom in or out, or tapping motions to cause the device to perform various other functions.

Users can share information electronically. For example, digital content including photographs, videos, books, etc., are shared between users. In certain situations, users may want to quickly share digital content. Even though portable computing devices utilize touch based interaction(s), these interactions may be constrained to standard mechanisms. For example, copying and/or sharing content may require custom applications and specialized interactions, which may negatively impact the user's experience.

BRIEF DESCRIPTION OF THE DRAWINGS

Various embodiments in accordance with the present disclosure will be described with reference to the drawings, in which:

FIG. 6A illustrates an example of a user holding a computing device and grabbing a book item shown on a display screen of a second computing device;

FIG. 6B illustrates an example with a selected book item displayed in the display screen of the computing device;

FIG. 6C illustrates an example with text content associated with a book displayed in the display screen of the computing device;

FIG. 7A illustrates an example of a user holding the computing device and grabbing a movie item shown on a display screen of a second computing device;

FIG. 7B illustrates an example with a selected movie item displayed in the display screen of the computing device;

FIG. 7C illustrates an example with video content associated with a movie displayed in the display screen of the computing device;

DETAILED DESCRIPTION

Figure 1A:
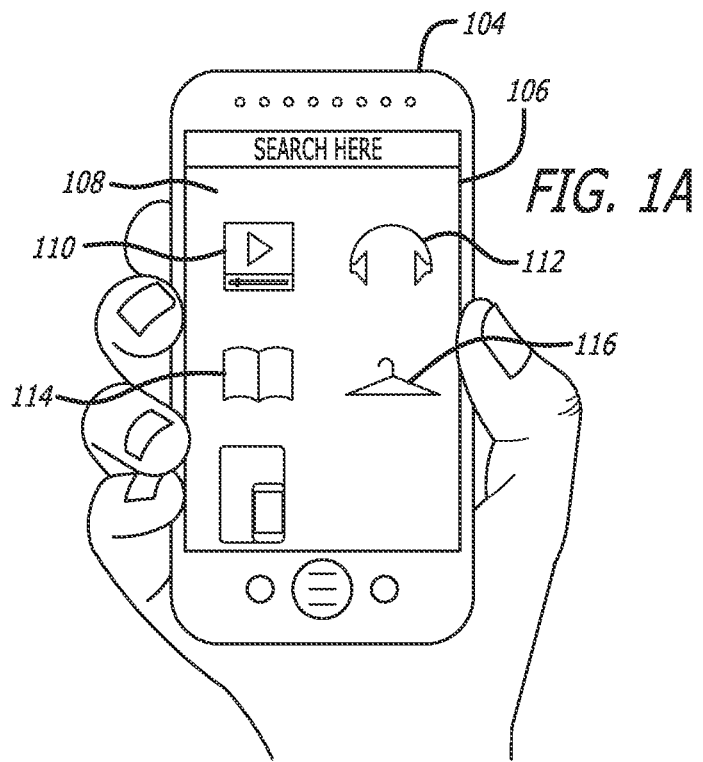
FIGS. 1A and 1B illustrate an example of a category of content that may be selected by a user in accordance with various embodiments.

In the following description, various embodiments are illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

As used throughout this disclosure, the term "gesture" means the action being performed by the user. For example, a gesture may be a motion made by the user's hand or fingers. A gesture therefore may be a physical movement performed by the user and include one or more characteristics such as direction, pressure, duration, etc. A gesture, in some examples, include motions, such as a swipe, a flicking, a flinging, or a grabbing a portion of an interface provided for display on a display screen. In an example, a gesture may include having two proximate computing devices physically touch each other. In another example, multiple gestures may be performed.

The term "user input" refers to the data that is received or determined by the computing device when the user makes the gesture. For example, the user input may include touch screen data detected by the touch screen of the computing device when the user makes a gesture while touching the screen of the device. As used herein, an "item" may correspond to any digital product or good, multimedia, and/or other tangible or intangible item that may be offered for consumption to a user. Content on a given computing device may be represented by an item in which the item could be a graphical representation(s) (e.g., icon, image, video, etc.) of a type or category of content, including for example, a movie, music, book, apparel, or any other type of product.

Embodiments described herein provide gesture driven content sharing between computing devices with varying display characteristics. For example, sharing of content between a source device and one or more target devices can be initiated by a gesture. It is appreciated that content can be shared using a standard or proprietary communication protocol(s), wireless or radio technology, etc. Sharing may be accomplished by an operating system running on a computing device, an application running on the computing device, the application working in conjunction with the operating system, and/or a service running locally on the computing device or provided remotely over a network or in the cloud. In an example, a source device may be a mobile computing device with a display screen with a first set of display characteristics, a target device may be a digital television device with a display screen with a second set of display characteristics. In some examples, a second target device may be a tablet computing device with a display screen with a third set of display characteristics. Such display characteristics may include a display size, screen resolution, color depth, aspect-ratio, etc. In some examples, a type of display screen technology (e.g., CRT, LCD, LED, OLED, plasma, electrophoretic, etc.) used in a given display screen may determine at least some of the display characteristics.

A gesture performed on a touchscreen display may initiate an action to be performed by an application, service, or software plugin as described further herein with respect to content (or a representation of content) shared from a device. Embodiments may be implemented as a software service that handles the delivery of information related to content for sharing between devices. For example, a "flinging" gesture for content (or a representation of content) on a device in the physical direction of proximate device can trigger information related to the content to be sent or copied to the proximate device. As used herein, flinging may refer to a gesture, when performed by a user, that includes a user's finger touching on the display screen (e.g., a touch screen or touch-sensitive display) of the device to initiate a selection of content provided for display, followed by a sliding or dragging motion of the finger across the display screen in a particular direction toward another proximate computing device.

Figure 1B:
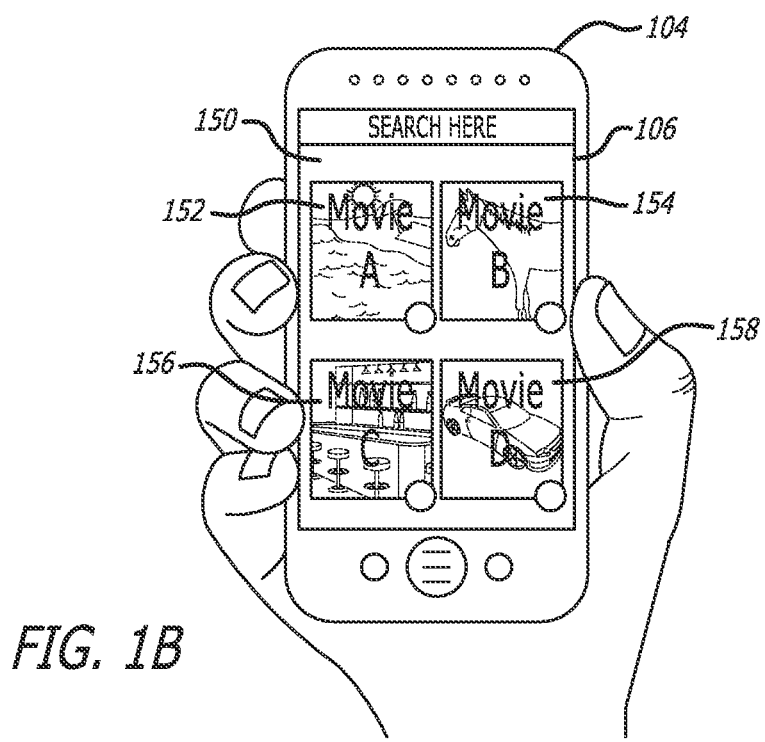

FIGS. 1A and 1B illustrate an example of a category of content that may be selected by a user. In FIG. 1A, a user is holding a computing device 104, which in this illustration, is shown to be a mobile computing device. It will be evident to one of ordinary skill in the art, that any number of other types of computing devices may be utilized in accordance with various embodiments described herein, including but not limited to mobile phones, tablet computers, electronic readers (e-readers), portable media players, personal digital assistants, laptops, wearable computing devices such as watches, glasses, visors or the like. In the illustrated embodiment, the user is making physical contact with a touch screen 106 to select one of a category of content 110 corresponding to movies or videos that is provided in an interface 108. As further shown, other categories of content provided in the interface 108 may include music 112, books 114, and apparel 116.

In FIG. 1B, movie items 152, 154, 156, and 158 represent graphical representations of respective movies as shown in an interface 150. In this example, upon selection of the category of content 110 corresponding to movies, the computing device 104 may determine movie content stored locally or provided remotely for sharing and provide for display representations of the movie content on the touch screen 106 of the computing device 104. The movie items 152, 154, 156, and 158, in an embodiment, are graphical representations of movies that are provided by an external source (e.g., third-party content provider, electronic marketplace, content repository, etc.). In a further embodiment, local and/or remote content may be determined by the computing device 140. The interface 108 shown in FIG. 1A, and the interface 150 shown in FIG. 1B may be provided in an application (e.g., mobile app) running on the computing device.

Figure 1C:
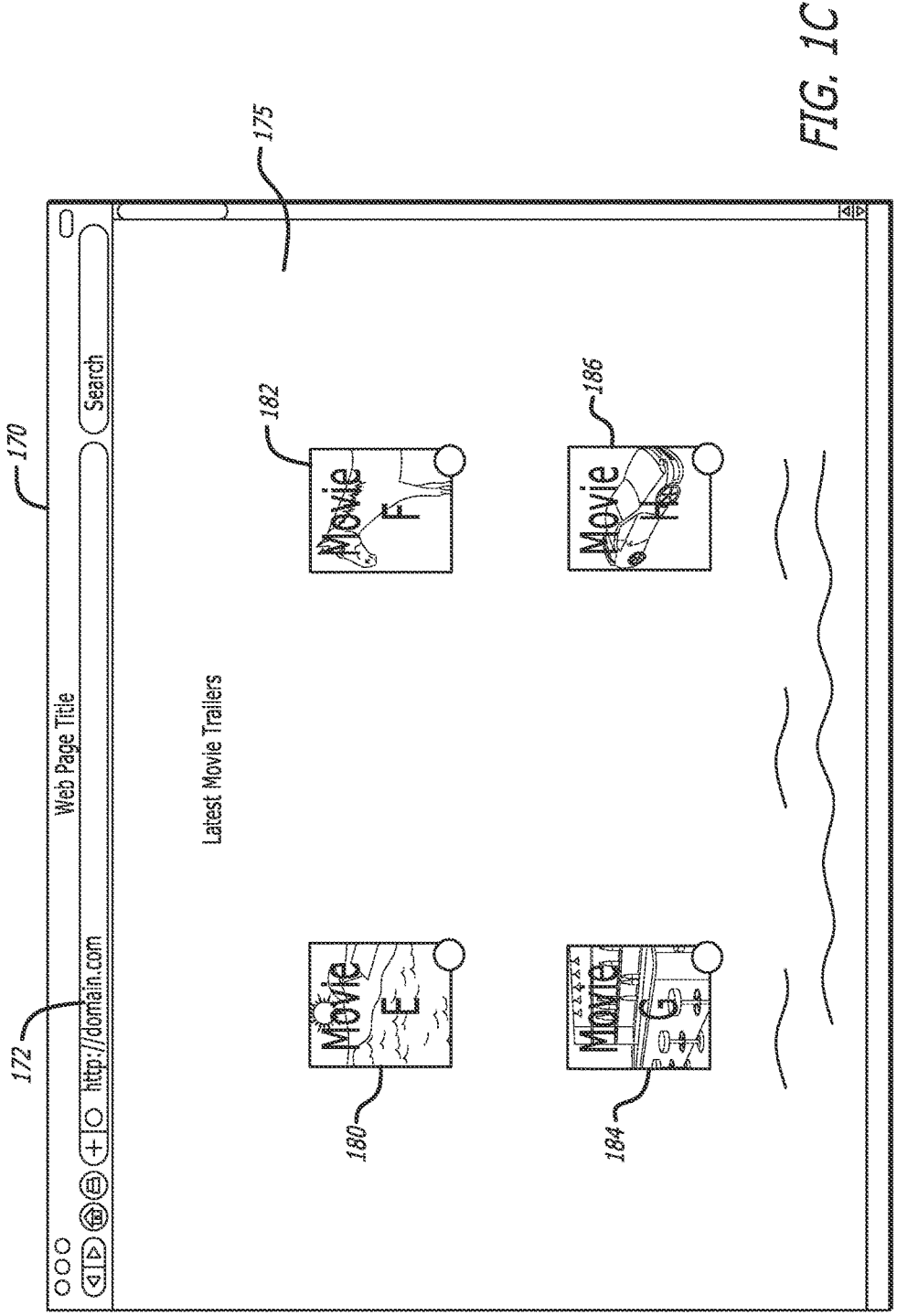
FIG. 1C illustrates an example interface provided by a web browser to share content in accordance with various embodiments.

It is further contemplated that sharing content may be provided in other interfaces, applications, or services. In another embodiment, FIG. 1C illustrates an example interface 175 provided by a web browser 170 to share content in accordance with various embodiments. The web browser may be running on a given computing device (e.g., desktop computer, laptop, mobile computing device, etc.). In this example, the web browser 170 may access a URL 172 corresponding to an address or (physical or logical) location of a web application that executes in the web browser. The web application may determine content, locally or remotely, for sharing with another computing device in a similar manner as described before. As illustrated, the web application provides for display representations of movie content 180, 182, 184, and 186. A user can select, by providing appropriate user input, one or more of the movie contents for sharing to another computing device.

Figure 1D:
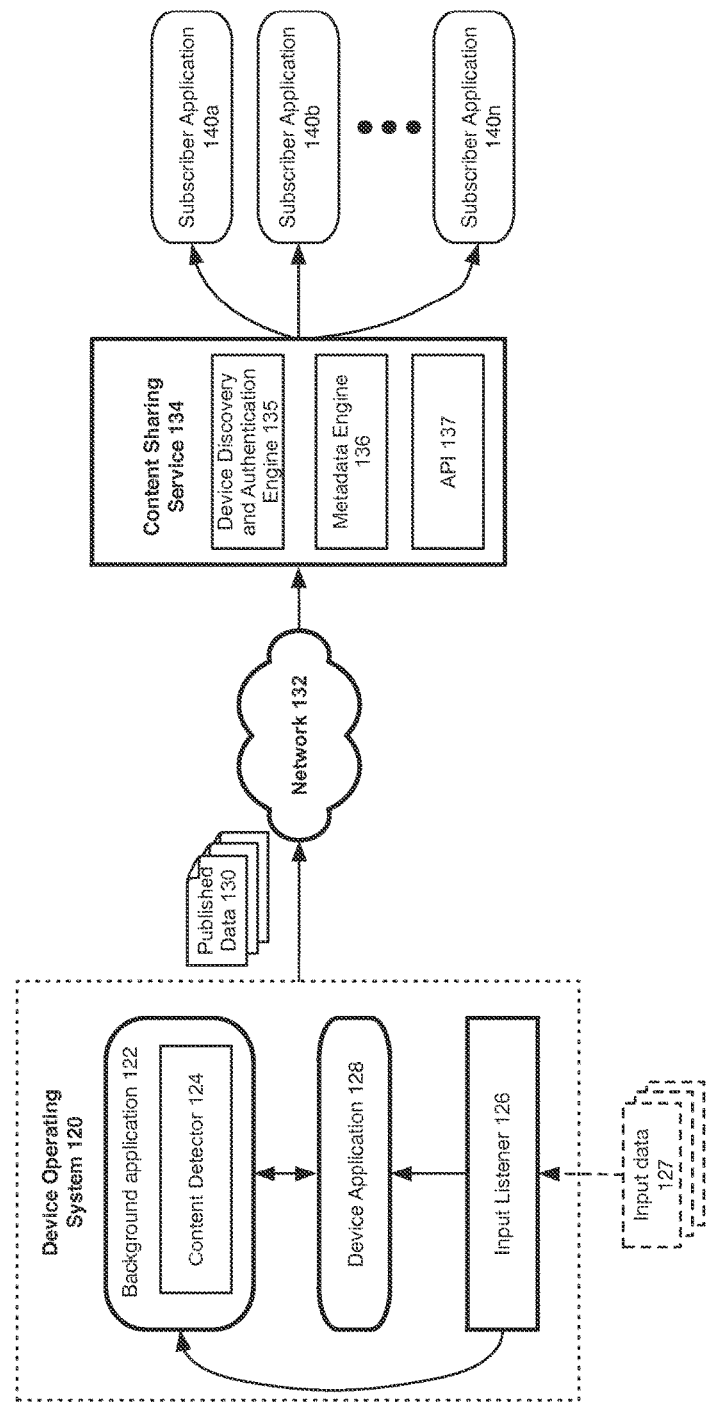
FIG. 1D illustrates an example computing environment including components for implementing aspects of the disclosure.

FIG. 1D illustrates an example computing environment including components for implementing aspects of the disclosure. The example computing environment, in an embodiment, include a device operating system 120 executing on a computing device. A background application 122 may be executing within the device operating system 120. The background application 122 may include a content detector 124. The device operating system 120 may include an input listener 126, which may be a software component running on the device operating system 120 that detects input events corresponding to various input data (e.g., gesture or touch-input, mouse-clicks or movement, keyboard-input, etc.), and may forward information for the input data to another application that has requested to receive the input data. In an embodiment, the background application 122 may request to receive information for input events that are detected by the input listener 126. The background application 122, for example, may provide to the input listener 126 information for defining a gesture that the input listener should detect. For example, a gesture, as defined by the background application 122, may include a combination of one or more input events (e.g., when a user first places a finger on a touch-sensitive display, when the user moves the finger around, when the user raises the finger off of the touch-sensitive display, etc.). Input events therefore may processed by the input listener 126 and interpreted as corresponding to the gesture by using the information that defined the gesture.

Information for content can be requested by the device application 128, and then provided by the content detector 124 to the device application 128. For example, the content detector 122 may determine content for sharing by identifying representations of content or parsing links to content on a web page, scanning content in a folder or directory or location provided in local (e.g., on the device) or remote (e.g., in the cloud) storage, and/or as provided or hosted in an external site, data source, or repository (e.g., electronic marketplace, content provider, etc.). A determination of the type of content can further be made. In an example, a link to the content may provide information that indicates the type of content, and in another example, a portion of the file name (e.g., extension) may indicate the type of content. In yet another example, metadata information provided in the web page, or stored locally or remotely may be used to determine the type of content.

The input listener 126, as a software component running on the device operating system 120, may listen to one or more input events 127 received by the device operating system 120. Such user input events may include input data corresponding to keyboard input, mouse input, and/or touch or gesture input. Touch or gesture input may include data for touch, swipe, and direction of the swipe, velocity, position, among other input data. In an example, the input listener 126 may receive input data 127 and forward information for the input data 127 to a device application 128 running on the operating system. The device application 128 may be a mobile device app, a web browser, thin client, among other types of applications. As further shown, the input listener 126 may forward information for the input data 127 to the background application 122.

In an embodiment, the background application 122 serves as a publisher of data, messages, or information to one or more subscriber applications. A publisher application publishes information, and one or more subscriber applications request and use the information. In an embodiment, a quanta of information suitable for publishing is referred to as an event. The publisher application therefore publishes events and subscriber applications can subscribe to events that match criteria or attributes as defined by the respective subscriber application(s). In an example, a publisher application (e.g., the background application 122) can communicate to one or more subscriber applications according to a topic (e.g., a logical grouping) or based on criteria including attributes or content. Each subscriber application can receive events published by the background application 122 if the event matches the criteria specified by the subscriber.

The background application 122 may send published data 130 (e.g., including one or more events) over a network 132 to a content sharing service 134. The content sharing service 134 acts as a middleware system or server that connects the publisher to subscribers. The content sharing service 134 receives published event(s) in the form of the published data 130 from the background application 122 and sends the event(s) to each of the subscribers. It is appreciated that, under this implementation, the publisher and subscribers do not need to have direct knowledge about each other to communicate.

In an embodiment, the content sharing service 134 is implemented as a Web service that supports a programmatic interaction with the content sharing service 134 (e.g., to exchange information) by exposing one or more defined APIs ("application program interfaces"). As a Web service, the content sharing service 134 enables different applications and different computing devices to interact, and may be implemented using various underlying protocols and techniques. For example, some Web service implementations return data in XML ("extensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services.

The content sharing service 134 includes an API 137 for publishers and for subscribers. The API 137 defines one or more procedures that allow respective publishers and subscribers to interface with the content sharing service 134. Thus, different publishers and subscribers can be connected to the content sharing service 134, when using the procedures defined by the API.

A device discovery and authentication engine 136 may perform operations to discover one or more devices that are in proximity to the computing device hosting the device operating system 120. In an example, a location of a computing device in proximity may be determined using one or more techniques including GPS signals, a Wi-Fi network in which the computing device is connected to, a specified location of the computing device, etc. The location of a proximate computing device may also include a relative position of the proximate computing device to computing device running the device operating system 120 with the background application 122. Once discovered, a respective proximate device may be authenticated by the device discovery and authentication engine 136 using an authentication technique (e.g., device ID, username and password, PIN, MAC address, unique key or string, etc.). In another example, at least one sensor of the computing device may be used to detect the proximate computing device. For example, a camera of the computing device may capture one or more images (or video) and perform an object recognition algorithm on the captured image(s) to identify the proximate computing device. Using the object recognition algorithm, a feature in the image(s) may be located that identifies the proximate computing device and its relative location to the computing device. In an embodiment, detecting an outline and/or a shape of the proximate computing device may identify the proximate computing device.

In the example of FIG. 1D, the device discovery and authentication engine 136 may determine that a subscriber application 140a, a subscriber application 140b, and a subscriber application 140n are all located within the proximity of the computing device running the background application 122. Each subscriber application (e.g., web browser, web application, mobile device application, desktop application, thin client, etc.) may be running on a respective computing device (not illustrated in FIG. 1D).

As mentioned before, the published data 130 is sent from the background application 122, which may include information for events (e.g., information corresponding to a flinging gesture selecting a representation of content displayed on the computing device, information corresponding to a direction of the flinging gesture, information corresponding to the selected content, etc.) A metadata engine 136 may determine additional information for including in the published data 130. For example, the metadata engine 136 may obtain (e.g., by requesting from an external source) metadata information for describing the selected content indicated in the published data 130, and include this metadata information with published data 130 that will be sent to each of the subscriber applications. The metadata information, for example, may include a location or URL of the selected content, among other types of information.

Figure 2A:
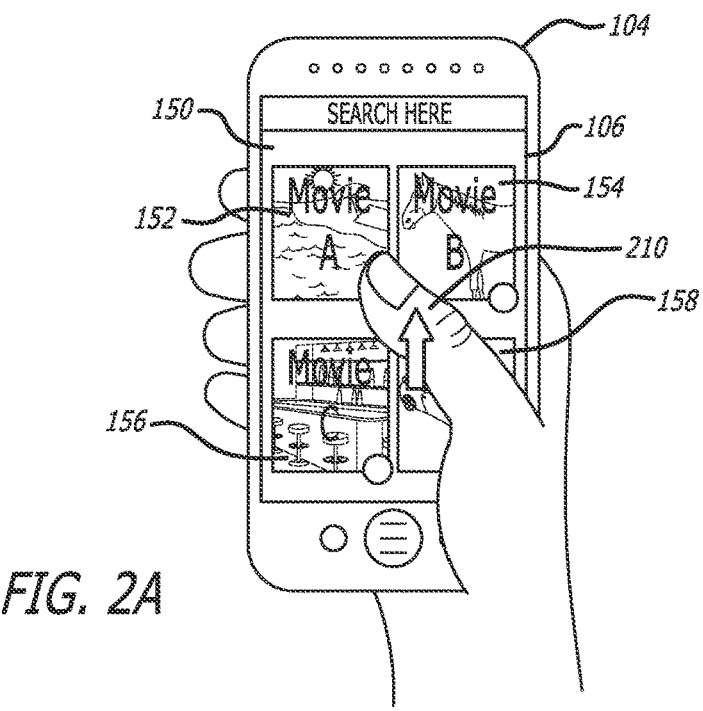
FIGS. 2A and 2B illustrate an example of a gesture that may performed by the user to send content to a different device with different display characteristics.
Figure 2B:
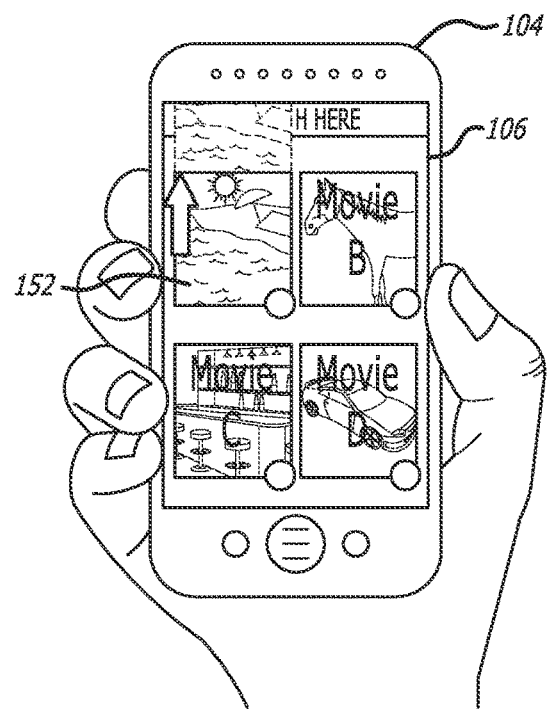

FIGS. 2A and 2B illustrate an example of a gesture that may performed by the user to send content to a different device with different display characteristics. In FIG. 2A, a user is holding a user is holding the computing device 104. The interface 150 shows the movie items 152, 154, 156, and 158. In an embodiment, each of the movie items are respective representations of movie content (e.g., a thumbnail image of a movie). In this example, a finger 210 of the user selects, by touching the touch screen 106 (e.g., a touch contact), the movie item 156 and performs a gesture to "fling" the selected movie item in a direction, along or across a plane or surface of the touch screen 106 (e.g., a touch movement), toward another computing device located in the proximity of the computing device 104. By reference to FIG. 1D, information for the gesture, including data indicating the direction of the gesture and the selected movie item, may be forwarded by the input listener 126 to the background application 122. The background application 122 may then publish the data by forwarding it to the content sharing service 134, which may then send the published data to one or more subscriber applications based at least in part on the information included in the published data (e.g., the direction of the gesture for instance that corresponds to a position of a respective proximate computing device). As illustrated in FIG. 2B, the selected movie item 156 may be displayed in the interface as moving (e.g., via an animated sequence or series of images) toward the direction of the other computing device based on the performed fling gesture. The fling gesture may be graphically indicated to the user in this manner illustrated in FIG. 2B.

Figure 3:
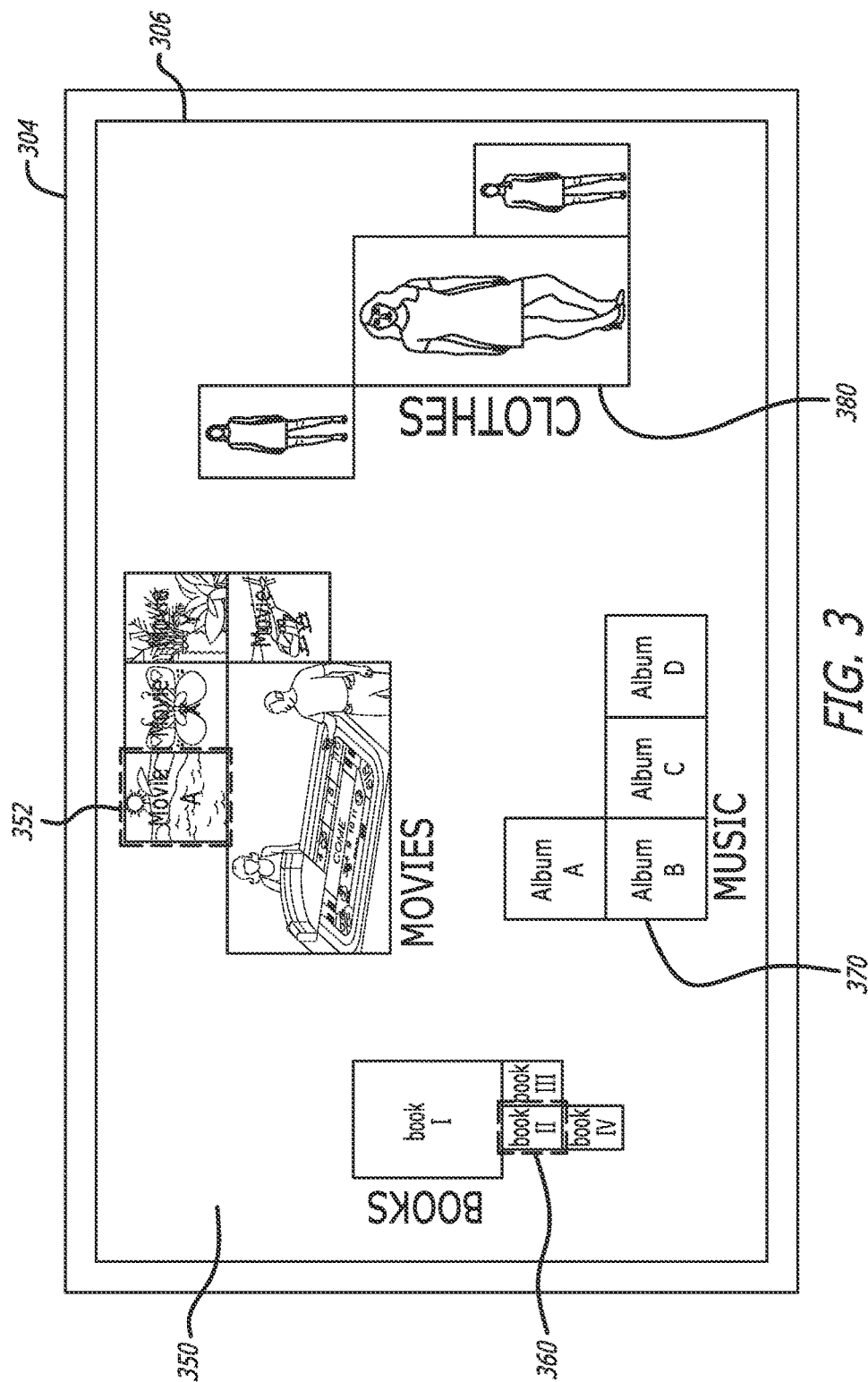
FIG. 3 illustrates an example of a computing device with a display screen that provides an interface for displaying graphical representations of items, including some item(s) that are shared from one or more other computing devices.

FIG. 3 illustrates an example of a computing device 304 with a display screen 306 that provides an interface 350 for displaying graphical representations of items, including some item(s) that are shared from one or more other computing devices. For example, item 352 represents the movie item 152 shared from the computing device 104 in the above-discussed examples. Again, by reference to FIG. 1D, information for the gesture from a first computing device (e.g., a mobile device), including data indicating the direction of the gesture and the selected movie item 152, may be received by the input listener 126 and forwarded to the background application 122. The background application 122 may publish the data by forwarding it to the content sharing service 134, which in this example includes additional metadata into the published data identifying a location of external content (e.g., a video of a trailer) corresponding to the movie item 152, and sends the published data to the subscriber application running on the computing device 304. The subscriber application on the computing device 304 receives this published data and determines a manner and location for displaying and positioning a representation of content corresponding to the initially shared movie item 152.

The computing device 304, in this example, may include a large display screen 306 (e.g., digital television screen), which has different display characteristics than the smaller touch screen 106 of the computing device 104. The item 352 therefore may be represented in a different manner based on the different display characteristics of the computing device 304. In an embodiment, the computing device 304 may also display other items as shown in the interface 350, which may also display a book item 360 that was shared from the computing device 104 by flinging content to the display screen 306 of the computing device 304. As further shown, the interface 350 may also display representations of music items 370 and apparel items 380 that are displayed as various square or rectangular tiles or blocks adjacent to one another. A representation of an item in the interface 350 may be animated (e.g., cycling through one or more images at a specified rate) or a static image. It is appreciated that other arrangements and manners for displaying the respective items in the interface 350 may be provided.

In an embodiment, the interface 350 may organize representations of content into respective sectors (or portions) that are displayed on the display screen 306. For example, the interface 350 in this example includes respective sectors (e.g., an area or portion of the interface) for displaying, arranging, and/or organizing representations of book content, movie content, music content and apparel content. In a given sector including content organized according to the type of content, respective graphical representations of a particular type of content (e.g., movies, books, music, apparel, etc.) may be provided for display substantially adjacent to each other (e.g., a tile pattern, where respective representations of content are square shapes). In this regard, embodiments may provide logic, for local processing on a respective device, that implements and controls the interface 350 to present and organize the displayed content. It is appreciated that other techniques for organizing the content for display may be used than that described above.

Figure 4A:
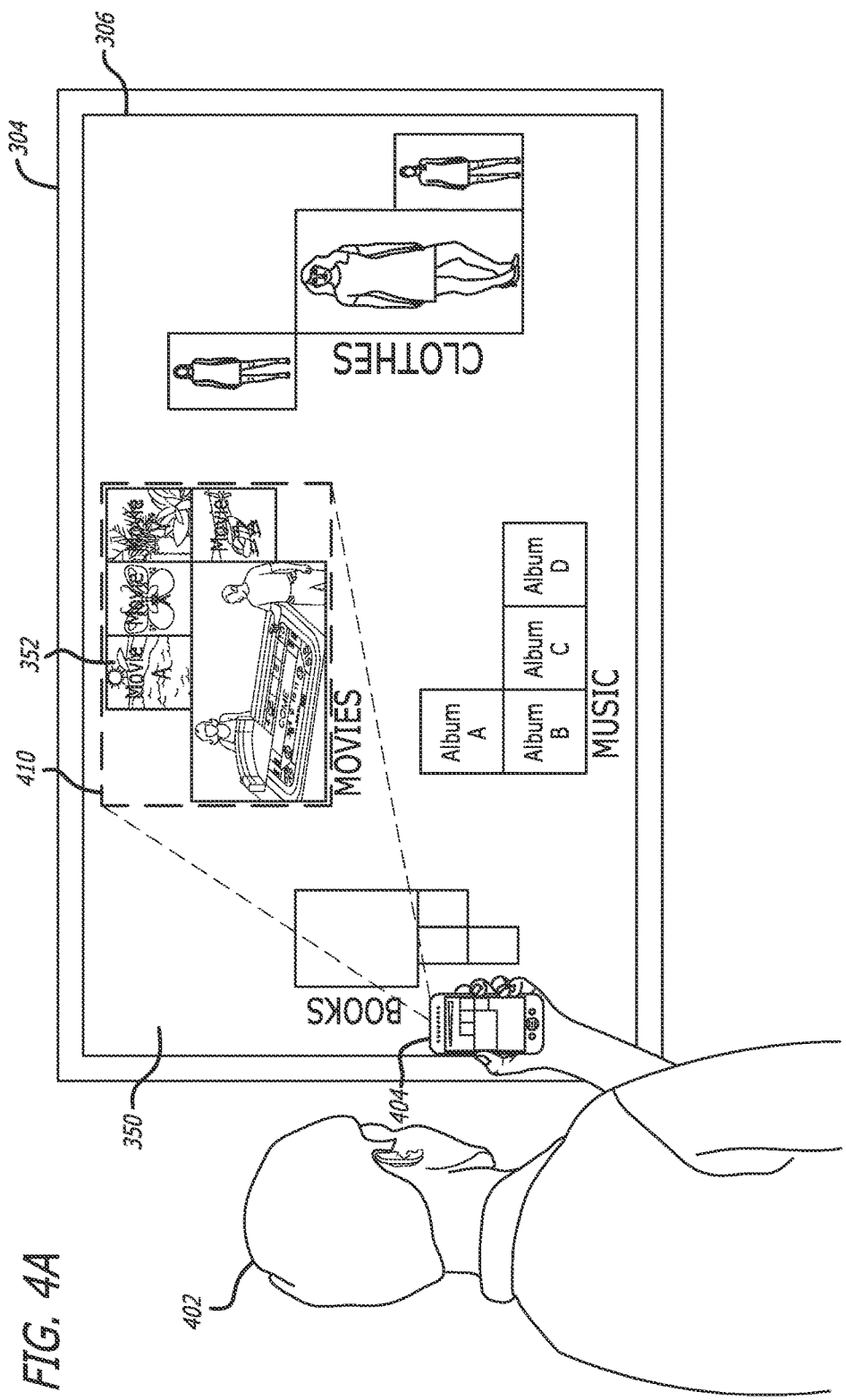
FIG. 4A illustrates an example situation where a user is holding a computing device which a smaller display screen than the display screen of the computing device.

In some embodiments, a user may use an image capturing component of a computing device (e.g., a mobile or portable computing device) to capture portions of the interface shown on the computing device 304 for display on a display screen of that computing device. In an embodiment, the display screen may be a touch-sensitive display screen. FIG. 4A illustrates an example situation where a user 402 is holding a computing device 404 which a smaller display screen than the display screen 306 of the computing device 304. The user 402 aims an image capturing component (e.g., a camera or image sensor) of the computing device 404 to capture a portion 410 of the interface 350 which includes multiple movies items. The image capturing component may have a field of view which includes the portion 410 of the interface 350, and is provided for display on the display screen of the computing device 404. Any appropriate image analysis technique(s) can be used for identifying the captured movie items, including image matching with corresponding content, image fingerprinting, etc. In a further embodiment, for identifying the portion 410 of the interface 350 that is captured by the image data (e.g., corresponding to a type of content), additional techniques may be used to reduce the processing time for identifying capture content. In one example, respective positions of sectors, that group content items according to the type of content in the interface 350, are known, and using the known positions of the sectors, the type of content may be determined. A gradient of the sectors including in the interface 350 and then compared to a gradient of the captured image data to determine the matching sector of the interface 350. In another example, hue or color comparisons may be made between the captured image data and portions of the interface 350 to determine the type of content. Pattern matching techniques are also contemplated for identifying the type of content.

Figure 4B:
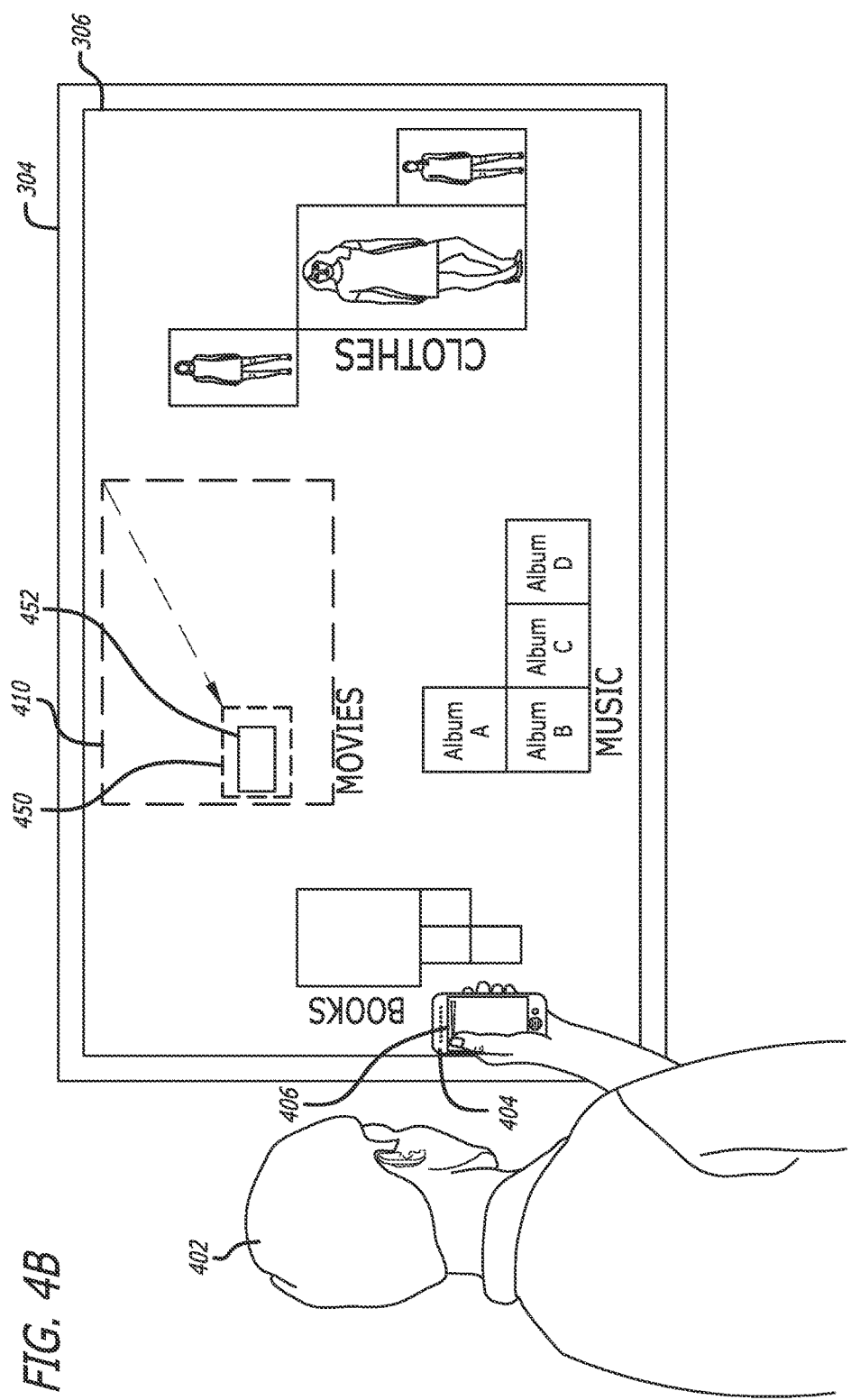
FIG. 4B illustrates an example where the items included in the portion of the interface are minimized or shrunk into sub-portion of the interface.

As shown in FIG. 4B, the user provides input by selecting or pressing on a position 406 of the display screen of the computing device 404 to proceed with a content minimizing process that minimizes or shrinks representations of the captured items from the portion 410. Again, by reference to FIG. 1D, information for the user input from the computing device 404 (e.g., a mobile device) may be received by the input listener 126 and forwarded to the background application 122. The background application 122 may publish the data by forwarding it to the content sharing service 134, which in this example includes additional metadata into the published data identifying one or more captured content items from the portion of the interface 350, and sends the published data to the subscriber application running on the computing device 304. The subscriber application on the computing device 304 receives this published data and performing a content minimizing process that shrinks the graphical representations of the corresponding representations of content displayed in the interface 350 based at least in part on the information in the published data.

FIG. 4B therefore illustrates an example where the items included in the portion 410 of the interface 350 are minimized or shrunk into sub-portion 450 of the interface 350. As illustrated, the sub-portion 450 is a smaller area within the portion 410, which is displayed with a graphical representation 452 that represents the shrunken or minimized items.

Figure 5:
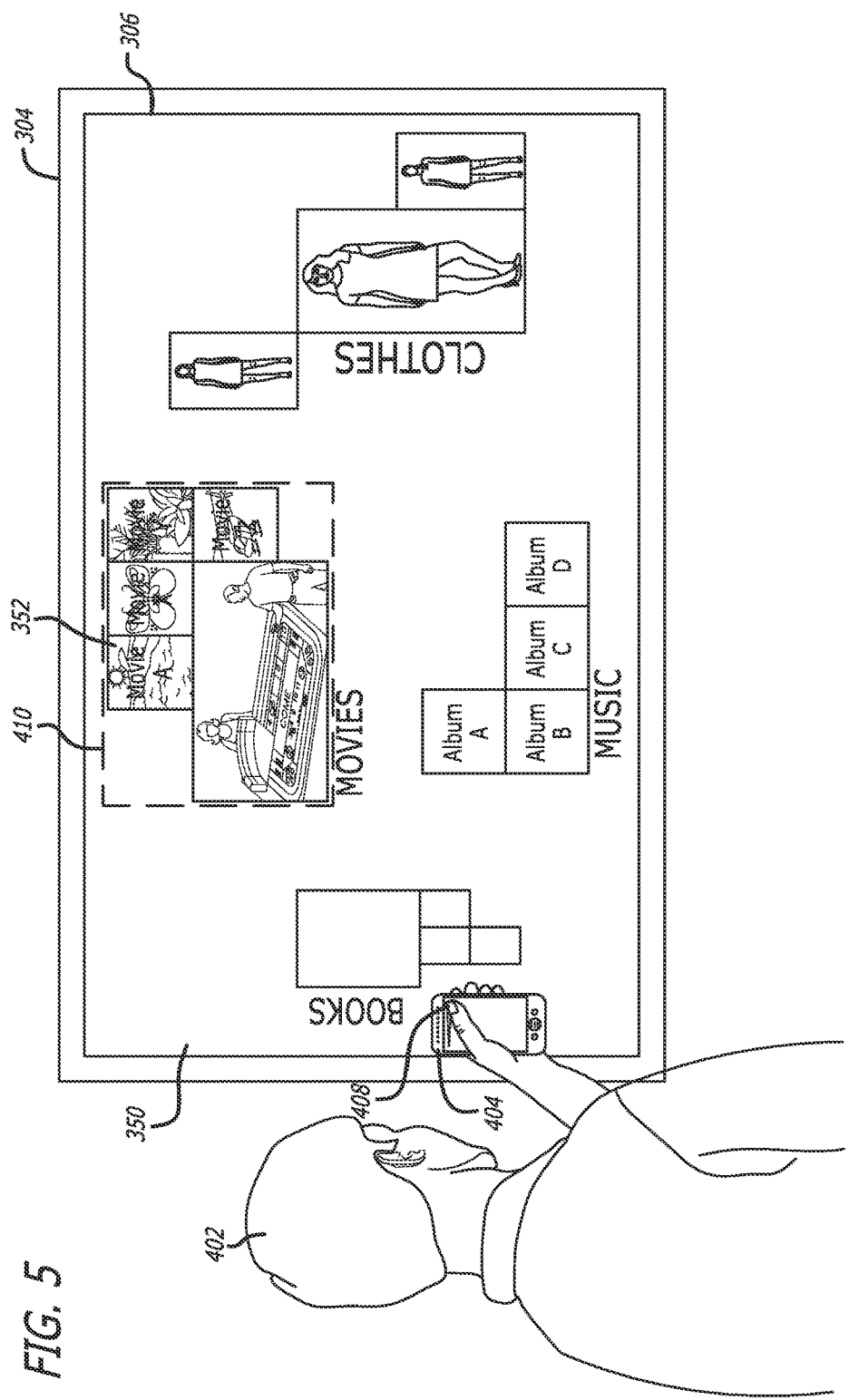
FIG. 5 illustrates an example of expanding a previously shrunken set of items.

The user may also maximize or enlarge the sub-portion 450 to display the items back to their previous state. FIG. 5 illustrates an example of expanding a previously shrunken set of items. In the example of FIG. 5, the user 402 selects or touches a position 408 on a display screen to maximize or expand the sub-portion of the display screen in FIG. 4B back to the portion 410. The position 408 that the user 402 selects to enlarge the sub-portion 450 may be a different position of the display screen of the computing device 404 than the position 406 that is selected to shrink or minimize the portion 410. However, it is appreciated that in an embodiment, the user may touch a same position of the display screen to shrink and enlarge items in the same manner. Similar to the discussion above for minimizing a portion of the interface 350 including captured content items, on the backend, the user input for maximizing or expanding the previously shrunken content items is handled using the publisher and subscriber interaction between the computing device 404 and the computing device 304.

The user may also use a computing device to receive an item displayed on a display screen of another computing device. FIG. 6A illustrates an example of a user holding a computing device 604 and using an image capturing component, such as a camera, to grab or capture a book item 620 shown on a display screen of a second computing device. As shown, the book item 620 is within a field of view of the camera of the computing device 604. In an embodiment, by holding the computing device 604 and having the image capturing component or camera focus on the book item 620 for at least predetermined period of time (e.g., 3 seconds), which is displayed as an image 640 in an interface 608 in a display screen 606 (e.g., a touch-sensitive display screen), the book item 620 may be captured by the computing device 604. To identify an item of content, a representation of which is included in captured image data, the computing device performs image analysis or image matching with the captured image data. For example, an image fingerprinting technique executed locally on the computing device may be used to match the item of content with a data repository (e.g., database, index, etc.) of image information corresponding to items of content. Metadata for the identified content item may also be provided for further identifying or describing the content item, or indicating a source of the content (e.g., a URL or location). In an embodiment, a graphical button 642 is displayed to enable selection of the book item 620 by the user.

FIG. 6B illustrates an example with a selected book item 650 displayed in the display screen 606 of the computing device 604. The user may select a graphical element 652 in order to view content associated with the selected book item 650. For example, the computing device may retrieve content for the selected book item 650 from an appropriate source of content (e.g., local location, external site, content provider, repository, etc.) that may be indicated by metadata associated with the selected book item 650, which had been provided as a result of the image analysis or matching techniques described above. FIG. 6C illustrates an example where the content associated with the book item 650, as provided by the source of content, is provided for display in the display screen 606. In this example, the content is text.

Other types of items displayed on a display screen of another computing device may be selected. FIG. 7A illustrates an example of a user holding the computing device 604 and using an image capturing component (e.g., a camera) to grab a movie item 720 shown on a display screen of a second computing device. As shown in the display screen 606 of the computing device 604, the movie item 720 is within the field of view of the image capturing component, and an image 740 is provided that represents the captured movie item 720 taken from the display screen of the second computing device. In an embodiment, the user may select a graphical button 742 to select the movie item 720 displayed in an interface 708. FIG. 7B illustrates an example with a selected movie item 750 displayed in the display screen 606 of the computing device 604. The user may select a graphical element 752 in order to view content associated with the selected book item 750. FIG. 7C illustrates an example where the content associated with the movie item 750 is provided for display in the display screen 606. In this example, the content is a movie trailer or video 712.

Figure 8A:
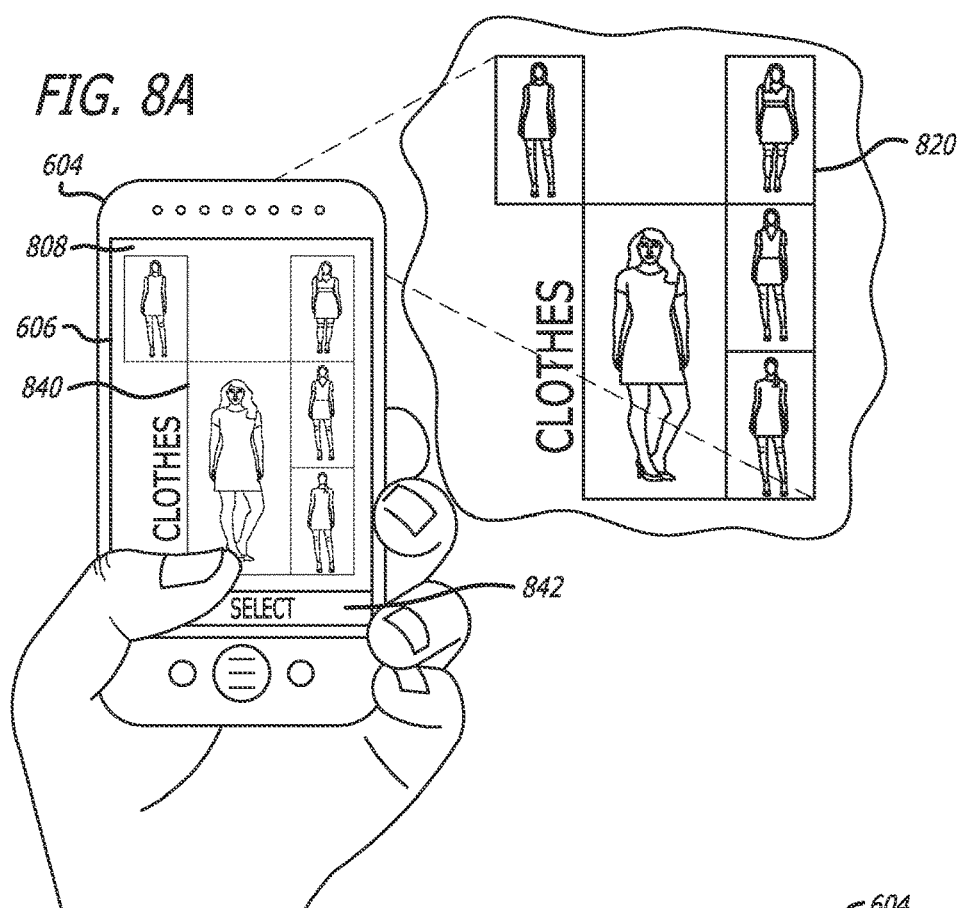
FIG. 8A illustrates an example where a user is capturing multiple clothing items on the display screen of the other computing device.

In another example, a user may take or capture, using the computing device 604, multiple items shown on a display screen of another computing device. FIG. 8A illustrates an example where a user is using an image capturing component (e.g., a camera) of the computing device 604 to capture multiple clothing items 820 shown on the display screen of the other computing device. As displayed in the display screen 606, when within the field of view of the camera, an image 840 is captured that represents the multiple clothing items 820. The user may select a graphical button 842 to capture the multiple clothing items 820 represented in the image 840.

Figure 8B:
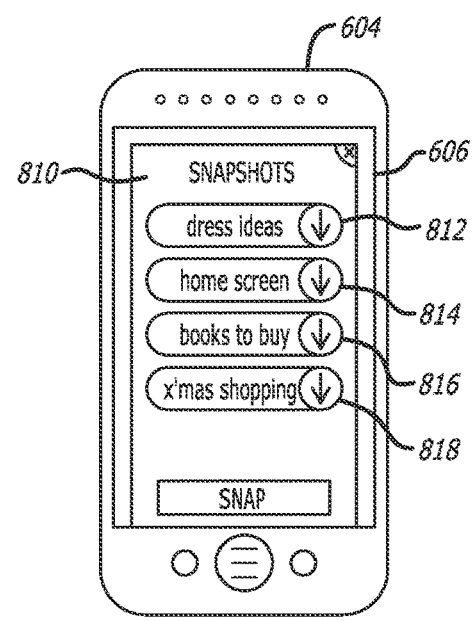
FIG. 8B illustrates an example interface that includes a set of graphical elements representing various captured "snapshots" of multiple items.

FIG. 8B illustrates an example interface 810 that includes a set of graphical elements representing various captured "snapshots" of multiple items. As used herein, a snapshot may refer to data associated with capturing multiple items, and may include information related to how each of the multiple items were arranged or positioned with respect to each other in a given interface. As displayed in the interface 810, each one of graphical elements 812, 814, 816, and 818 represents a respective snapshot.

Figure 9A:
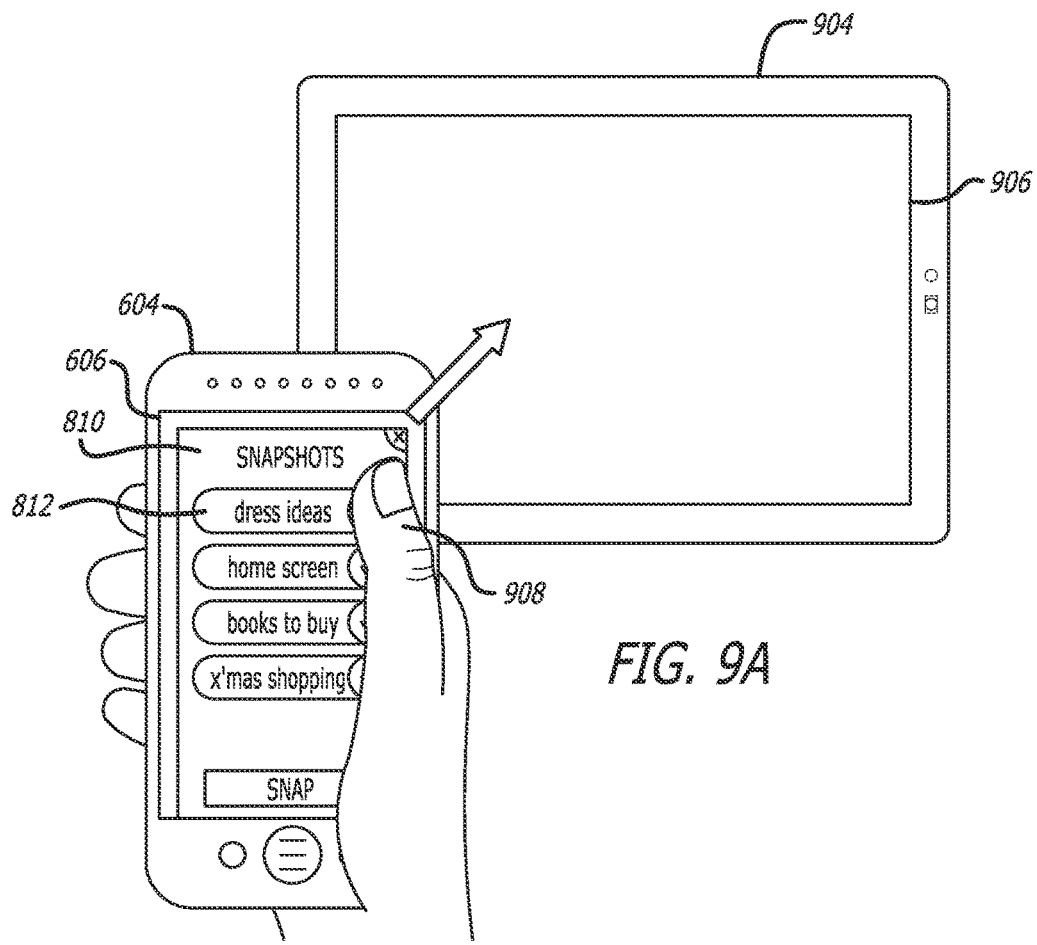
FIG. 9A illustrates an example in which a user shares a selected snapshot of items for display on another computing device.

In an embodiment, a user may share multiple items that are included in a given snapshot for display on another computing device. FIG. 9A illustrates an example in which a user shares a selected snapshot of items for display on another computing device. In this example, a user's finger 908 may select the graphical element 812 for sharing content for display on a display screen 906 of a proximate computing device 904 (e.g., a tablet computer). In an embodiment, the proximate computing device 904 may within a field of view of an image capturing component of the computing device 606. In an embodiment, the computing device 606 may determine that the proximate computing device 904 is proximate to the computing device 604.

Figure 9B:
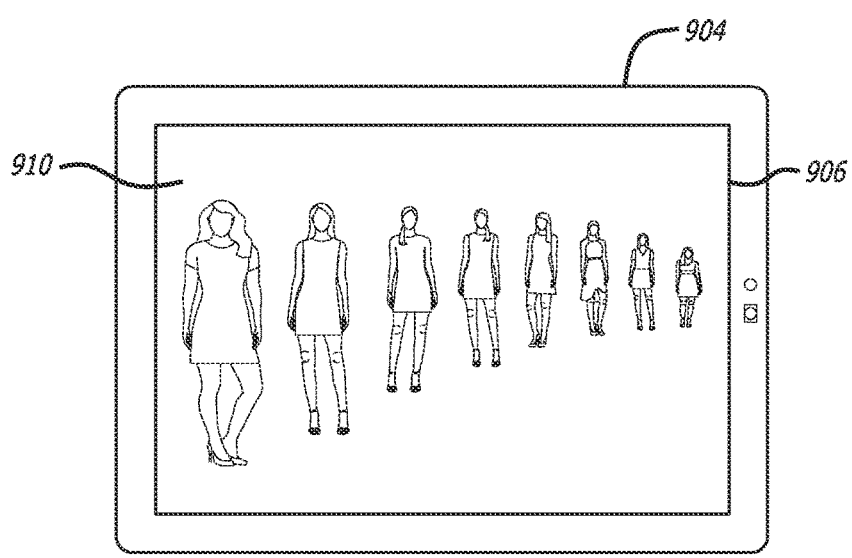
FIG. 9B illustrates an example of multiple clothing items from the shared snapshot provided for display on the display screen.

FIG. 9B illustrates an example of multiple clothing items from the shared snapshot 812 provided for display on the display screen 906. Because of different display characteristics between the computing device 904, the multiple clothing items may be provided for display, in this example, as a horizontal arrangement of clothing items.

Figure 10:
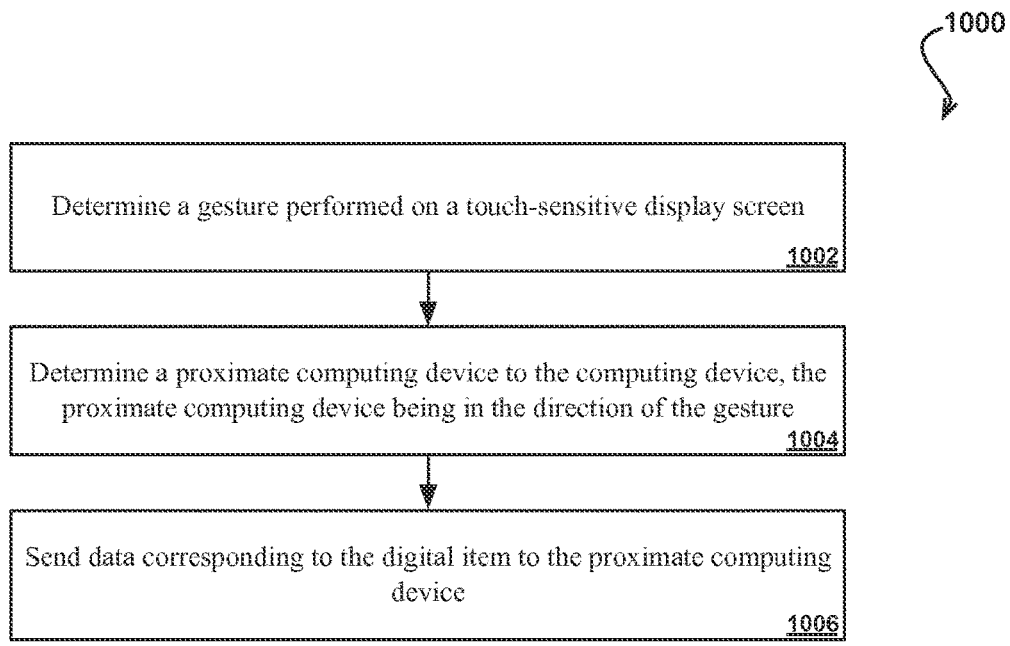
FIG. 10 illustrates an example process for sending data corresponding to a digital item to a proximate computing device that can be used in accordance with various embodiments.

FIG. 10 illustrates an example process 1000 for sending data corresponding to a digital item to a proximate computing device that can be used in accordance with various embodiments. Although this figure, as well as other process illustrations contained in this disclosure may depict functional steps in a particular sequence, the processes are not necessarily limited to the particular order or steps illustrated. One skilled in the art will appreciate that the various steps portrayed in this or other figures can be changed, rearranged, performed in parallel or adapted in various ways. Furthermore, it is to be understood that certain steps or sequences of steps can be added to or omitted from the process, without departing from the scope of the various embodiments. The process 1000 may be implemented by one or more computing devices or systems in some embodiments.

At step 1002, a gesture is determined to be performed on a touch-sensitive display screen, the gesture indicating a direction and including a selection of a digital item. At step 1004, a proximate computing device is determined, the proximate computing device being in the direction of the gesture. In an embodiment, the proximate computing device may be determined using location information associated with the proximate computing device, e.g., GPS, NEC or BLUETOOTH data. At step 1006, data corresponding to the digital item is sent to the proximate computing device.

Figure 11:
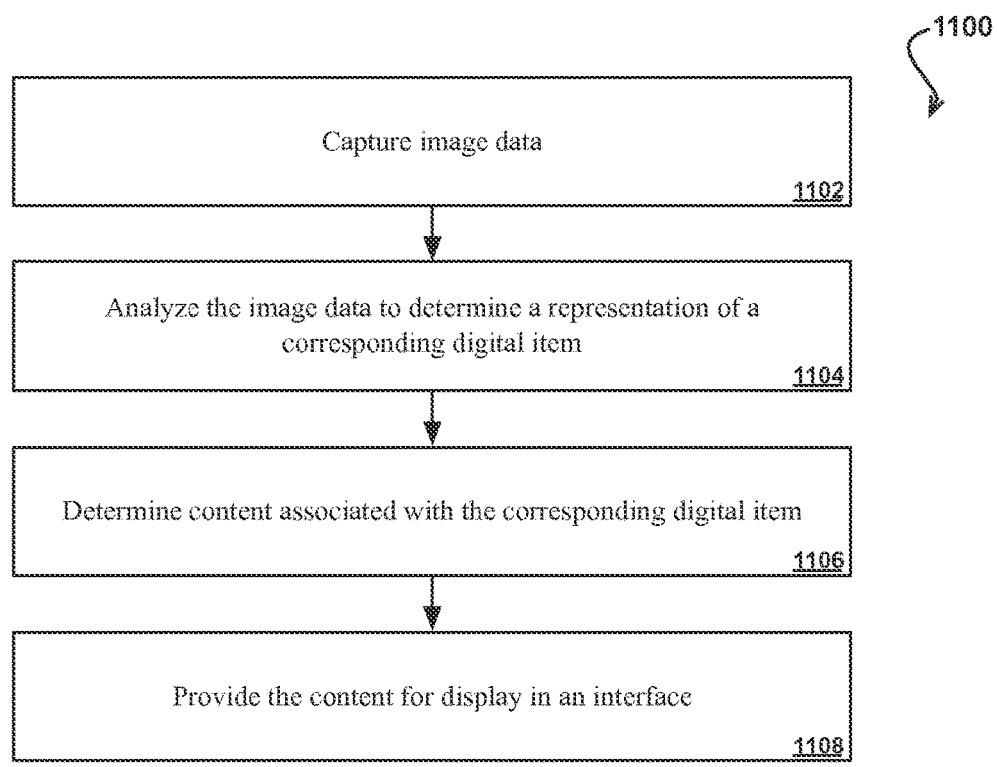
FIG. 11 illustrates an example process for providing content corresponding to a digital item that can be used in accordance with various embodiments.

FIG. 11 illustrates an example process 1100 for providing content corresponding to a digital item that can be used in accordance with various embodiments. The process 1100 may be implemented by one or more computing devices or systems in some embodiments.

At step 1102, image data is captured, the image data corresponding to at least a portion of an interface displayed on a display screen of a proximate computing device, the displayed interface including one or more representations of digital items. At step 1104, the image data is analyzed to determine a representation of a corresponding digital item. At step 1106, content associated with the corresponding digital item is determined. At step 1108, the content is provided for display in an interface displayed on a touch-sensitive display screen.

Figure 12:
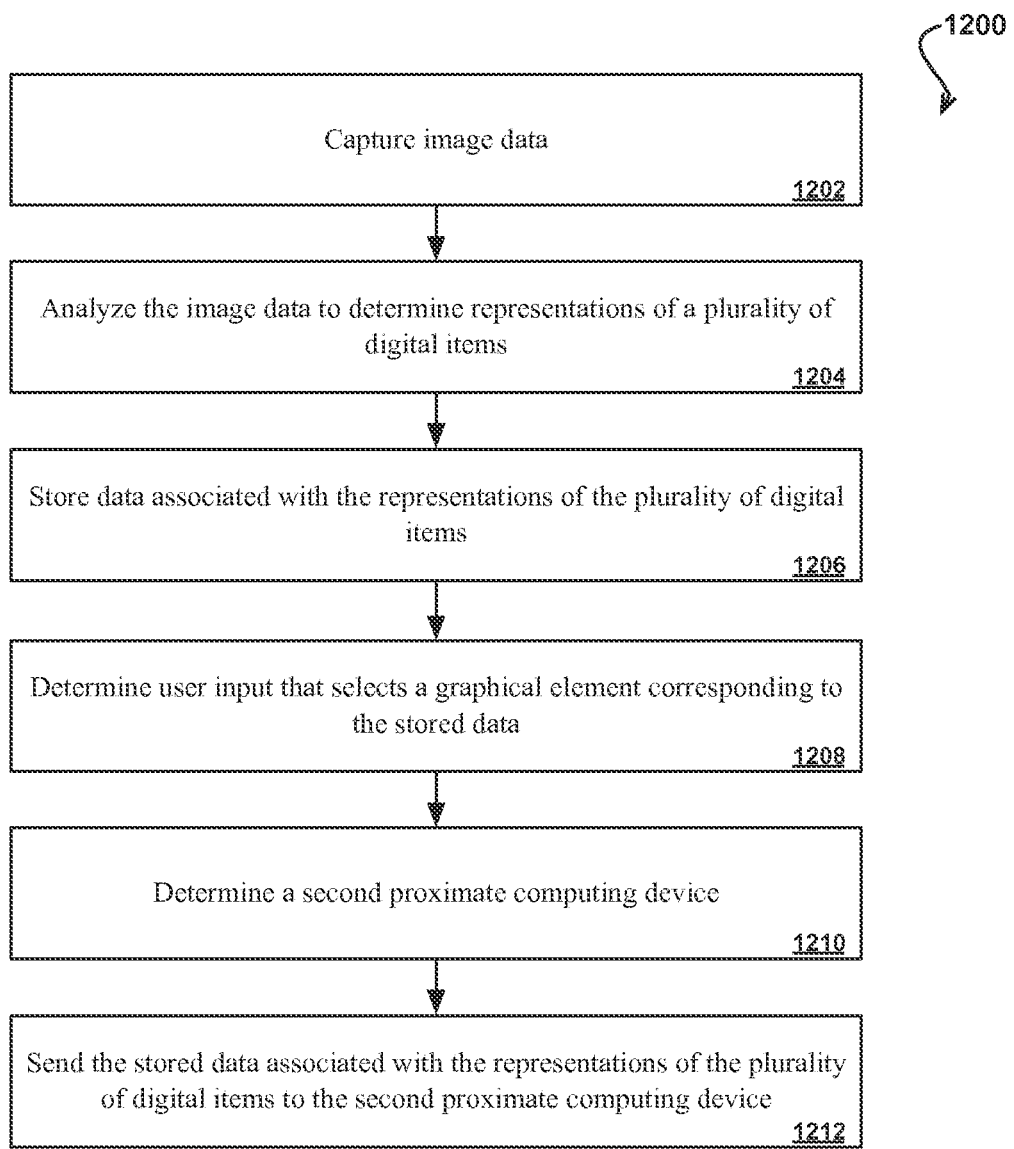
FIG. 12 illustrates an example process for providing digital items stored in a snapshot to another proximate computing device that can be used in accordance with various embodiments.

FIG. 12 illustrates an example process 1200 for providing digital items stored in a snapshot to another proximate computing device that can be used in accordance with various embodiments. The process 1200 may be implemented by one or more computing devices or systems in some embodiments.

At step 1202, image data is captured, the image data corresponding to at least a portion of an interface displayed on a display screen of a proximate computing device. At step 1204, the image data is analyzed to determine representations of a plurality of digital items included in the interface. At step 1206, data associated with the representations of the plurality of digital items is stored. At step 1208, user input on the touch-sensitive display screen is determined that selects a graphical element corresponding to the stored data associated with the representations of the plurality of digital items. At step 1210, a second proximate computing device is determined. At step 1212, the stored data associated with the representations of the plurality of digital items is sent to the second proximate computing device, the second proximate computing device having a display screen with a different set of display characteristics than the touch-sensitive display screen.

Figures 13A, 13B:
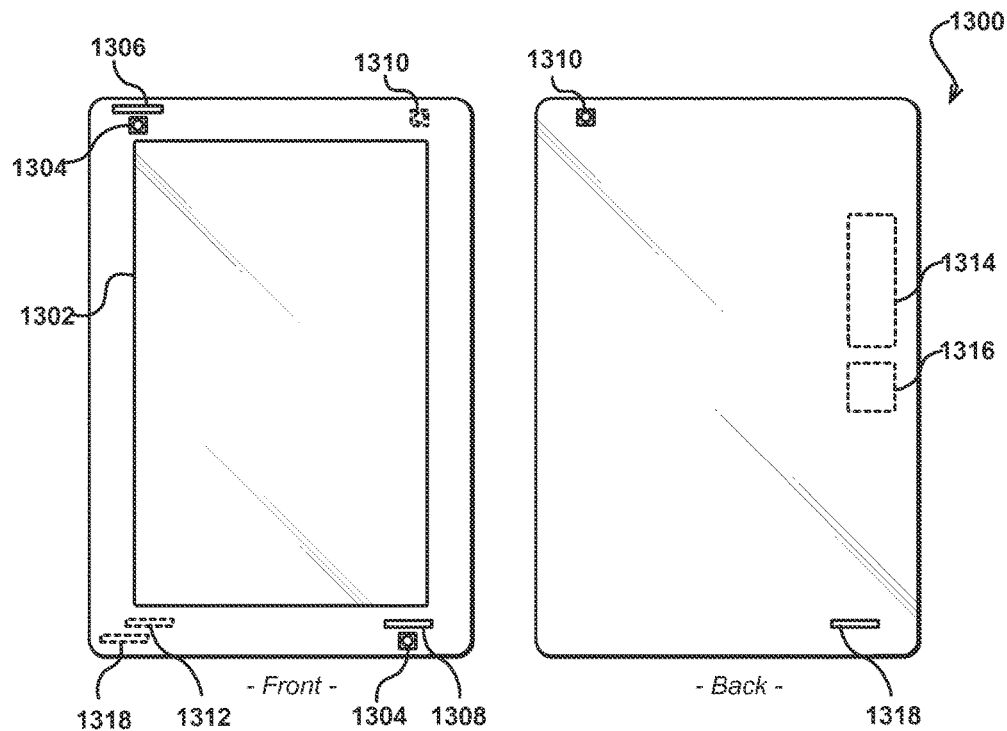
FIGS. 13A and 13B illustrate front and back views, respectively, of an example electronic computing device that can be used in accordance with various embodiments.

FIGS. 13A and 13B illustrate front and back views, respectively, of an example electronic computing device 1300 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 1300 has a display screen 1302 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 1304 on the front of the device and at least one image capture element 1310 on the back of the device. It should be understood, however, that image capture elements could also, or alternatively, be placed on the sides or corners of the device, and that there can be any appropriate number of capture elements of similar or different types. Each image capture element 1304 and 1310 may be, for example, a camera, a charge-coupled device (CCD), a motion detection sensor or an infrared sensor, or other image capturing technology.

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 1308 on the front side, one microphone 1312 on the back, and one microphone 1306 on or near a top or side of the device. In some devices there may be only one microphone, while in other devices there might be at least one microphone on each side and/or corner of the device, or in other appropriate locations.

The device 1300 in this example also includes one or more orientation- or position-determining elements 1318 operable to provide information such as a position, direction, motion, or orientation of the device. These elements can include, for example, accelerometers, inertial sensors, electronic gyroscopes, and electronic compasses.

The example device also includes at least one computing mechanism 1314, such as may include at least one wired or wireless component operable to communicate with one or more electronic devices. The device also includes a power system 1316, such as may include a battery operable to be recharged through conventional plug-in approaches, or through other approaches such as capacitive charging through proximity with a power mat or other such device. Various other elements and/or combinations are possible as well within the scope of various embodiments.

Figure 14:
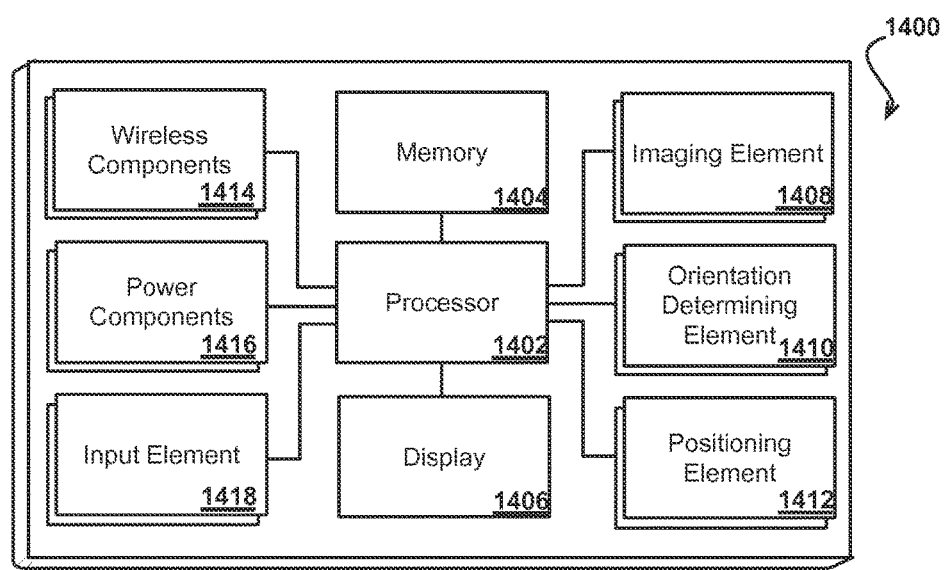
FIG. 14 illustrates a set of basic components of an electronic computing device such as the device described with respect to FIGS. 13A and 13B.

FIG. 14 illustrates a set of basic components of an electronic computing device 1400 such as the device 1300 described with respect to FIGS. 13A and 13B. In this example, the device includes at least one processing unit 1402 for executing instructions that can be stored in a memory device or element 1404. As would be apparent to one of ordinary skill in the art, the device can include many types of memory, data storage, or computer-readable media, such as a first data storage for program instructions for execution by the processing unit(s) 1402, the same or separate storage can be used for images or data, a removable memory can be available for sharing information with other devices, and any number of computing approaches can be available for sharing with other devices.

The device typically will include some type of display element 1406, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1408, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1400 also includes at least one orientation determining element 1410 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1400. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1412 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NEC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1414 operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1416, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1418 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 15:
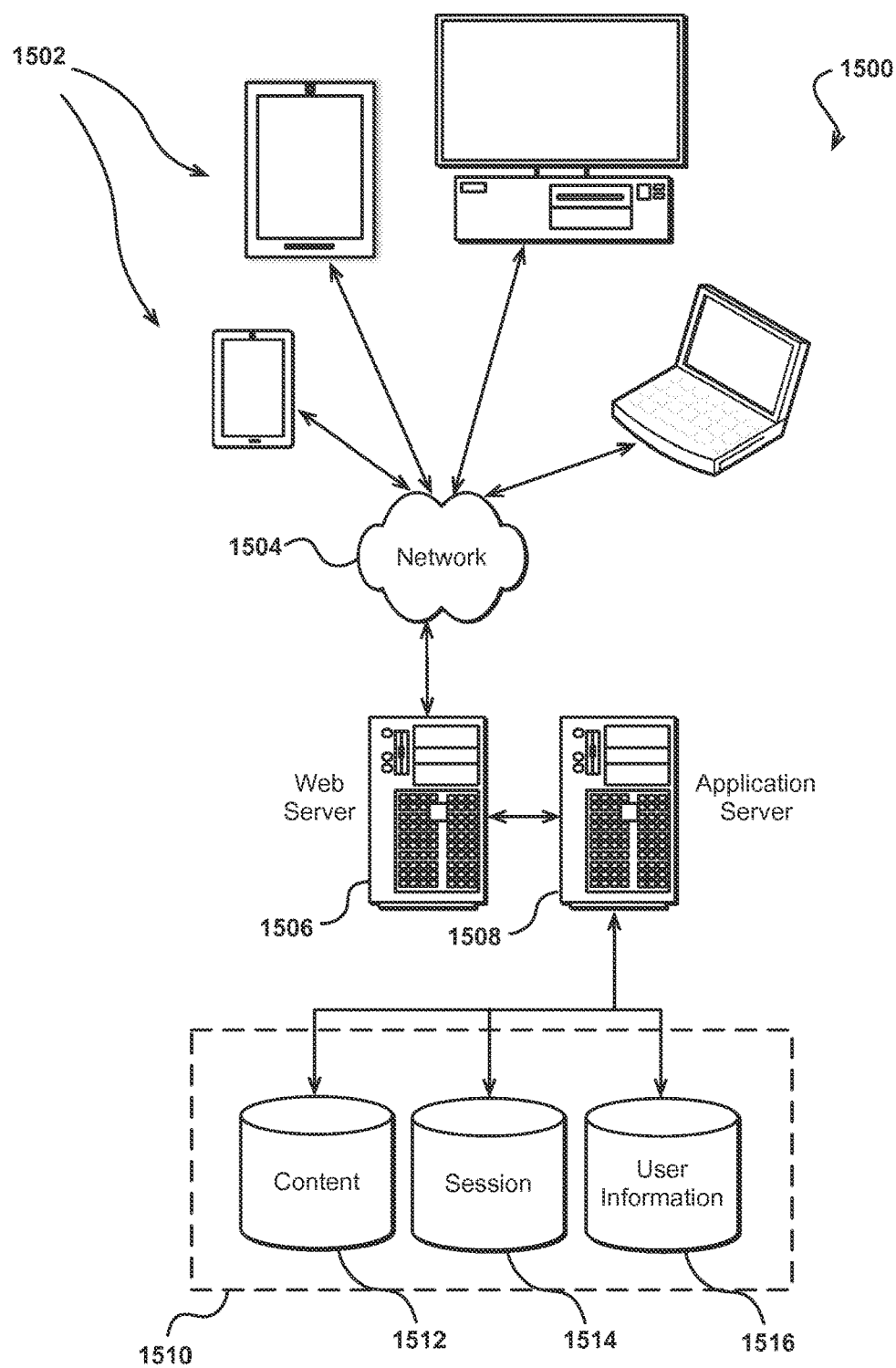
FIG. 15 illustrates an example of an environment for implementing aspects in accordance with various embodiments.

As discussed, different approaches can be implemented in various environments in accordance with the described embodiments. For example, FIG. 15 illustrates an example of an environment 1500 for implementing aspects in accordance with various embodiments. As will be appreciated, although a Web-based environment is used for purposes of explanation, different environments may be used, as appropriate, to implement various embodiments. The system includes an electronic client device 1502, which can include any appropriate device operable to send and receive requests, messages or information over an appropriate network 1504 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Computing over the network can be enabled via wired or wireless connections and combinations thereof. In this example, the network includes the Internet, as the environment includes a Web server 1506 for receiving requests and serving content in response thereto, although for other networks, an alternative device serving a similar purpose could be used, as would be apparent to one of ordinary skill in the art.

The illustrative environment includes at least one application server 1508 and a data store 1510. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1508 can include any appropriate hardware and software for integrating with the data store 1510 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1506 in the form of HTML, XML or another appropriate structured language in this example. The handling of all requests and responses, as well as the delivery of content between the client device 1502 and the application server 1508, can be handled by the Web server 1506. It should be understood that the Web and application servers are not required and are merely example components, as structured code discussed herein can be executed on any appropriate device or host machine as discussed elsewhere herein.

The data store 1510 can include several separate data tables, databases or other data storage mechanisms and media for storing data relating to a particular aspect. For example, the data store illustrated includes mechanisms for storing content (e.g., production data) 1512 and user information 1516, which can be used to serve content for the production side. The data store is also shown to include a mechanism for storing log or session data 1514. It should be understood that there can be many other aspects that may need to be stored in the data store, such as page image information and access rights information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1502. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device comprising:
at least one processor;
a camera;
a touch-sensitive display screen; and
a memory device including instructions that, when executed by the at least one processor, cause the at least one processor to:
identify digital content associated with a digital item using image data from the camera, at least one object recognition process, and sector data corresponding to a first representation of one or more images displayed by a proximate computing device;
display the digital content by the touch-sensitive display screen;
determine, based at least in part on the image data, a location of the proximate computing device relative to the computing device;
authenticate the proximate computing device;
receive input data including a gesture performed on the touch-sensitive display screen, the gesture including a touch contact corresponding to the digital content and a swiping motion on a surface of the touch-sensitive display screen;
determine that the swiping motion is in a direction toward the location of the proximate computing device; and
send information corresponding to one or more display characteristics associated with the one or more images to the proximate computing device, the information causing the proximate computing device to display a second representation of the one or more images.

2. The computing device of claim 1, wherein a second set of display characteristics of a display screen of the proximate computing device is different than a first set of display characteristics of the touch-sensitive display screen.

3. The computing device of claim 1, wherein the memory device includes further instructions, when executed by the at least one processor, further causing the at least one processor to:
capture the image data using the camera, the image data corresponding to at least a portion of a display screen of the proximate computing device, the portion of the display screen showing the first representation of one or more images;
analyze the image data to determine the sector data, wherein the sector data is associated with one or more types of content; and
provide the digital content for display by the touch-sensitive display screen.

4. The computing device of claim 1, wherein the memory device includes further instructions, when executed by the at least one processor, further causing the at least one processor to:
capture the image data using the camera, the image data corresponding to the first representation of the one or more images;
analyze the image data to determine the first representation includes a plurality of digital items; and
store data associated with the plurality of digital items.

5. The computing device of claim 4, wherein the memory device includes further instructions, when executed by the at least one processor, further causing the at least one processor to:

determine input data indicating a selection of one or more of the plurality of digital items;

determine a second proximate computing device to the computing device, the second proximate computing device being within a field of view of the camera; and send stored data associated with the one or more of the plurality of digital items to the second proximate computing device for display by a second display screen having a different set of display characteristics than the touch-sensitive display screen.

6. A computer-implemented method comprising:

determining, using at least image data from an image sensor of a first computing device, a location of a proximate computing device relative to the first computing device;

identifying digital content associated with a digital item based on the image data and sector data corresponding to a first representation of one or more images displayed by the proximate computing device;

authenticating the proximate computing device;

determining a swiping gesture performed on a surface of a touch-sensitive display screen is in a direction toward the proximate computing device;

determining that the swiping gesture includes a selection of the digital item and instructions associated with one or more display characteristics for the proximate computing device; and sending data corresponding to the digital item and the instructions to the proximate computing device to cause the proximate computing device to display a second representation of the one or more images.

7. The computer-implemented method of claim 6, wherein a set of display characteristics of a display screen of the proximate computing device is different than a set of display characteristics of the touch-sensitive display screen.

8. The computer-implemented method of claim 6, further comprising:

capturing the image data, the image data corresponding to at least a portion of a display screen of the proximate computing device, the display screen showing the first representation of one or more images;

analyzing the image data to determine the sector data, wherein the sector data is associated with one or more types of content; and providing the digital content for display by the touch-sensitive display screen.

9. The computer-implemented method of claim 8, wherein the digital content includes at least one of an image, text, audio, or video.

10. The computer-implemented method of claim 6, wherein the one or more types of content include movies, music, books, or apparel.

11. The computer-implemented method of claim 6, further comprising:

capturing the image data, the image data corresponding to the first representation of the one or more images;

analyzing the image data to determine the first representation includes a plurality of digital items; and storing data associated with the plurality of digital items.

12. The computer-implemented method of claim 11, further comprising:

determining input data from the touch-sensitive display screen selects one or more of the plurality of digital items;

determining a second proximate computing device; and sending stored data associated with the one or more of the plurality of digital items to the second proximate computing device for display by a display screen having a different set of display characteristics than the touch-sensitive display screen.

13. A non-transitory computer-readable medium including instructions stored therein that, when executed by at least one computing device, cause the at least one computing device to:

determine, using at least image data from an image sensor of the at least one computing device, a location of a proximate computing device relative to the at least one computing device;

identify digital content associated with a digital item based on the image data and sector data corresponding to a first representation of one or more images displayed by the proximate computing device;

authenticate the proximate computing device;

determine a swiping gesture performed on a surface of a touch-sensitive display screen is in a direction toward the proximate computing device;

determine that the swiping gesture includes a selection of the digital item and instructions associated with one or more display characteristics for the proximate computing device; and send data corresponding to the digital item and the instructions to the proximate computing device to cause the proximate computing device to display a second representation of the one or more images.

14. The non-transitory computer-readable medium of claim 13, wherein a set of display characteristics of a display screen of the proximate computing device is different than a set of display characteristics of the touch-sensitive display screen.

15. The non-transitory computer-readable medium of claim 13, wherein the instructions further cause the at least one computing device to:

capture the image data, the image data corresponding to at least a portion of a display screen of the proximate computing device, the display screen showing the first representation of one or more images;

analyze the image data to determine the sector data, wherein the sector data is associated with one or more types of content representation of digital item; and provide the digital content for display by the touch-sensitive display screen.

16. The non-transitory computer-readable medium of claim 15, wherein the digital content includes at least one of an image, text, audio, or video.

17. The non-transitory computer-readable medium of claim 13, wherein the one or more types of content includes movies, music, books, or apparel.

18. The non-transitory computer-readable medium of claim 13, wherein the instructions further cause the at least one computing device to:

capture the image data, the image data corresponding to the first representation of the one or more images;

analyze the image data to determine the first representation includes of a plurality of digital items; and store data associated with the plurality of digital items.

19. The non-transitory computer-readable medium of claim 18, wherein the instructions further cause the at least one computing device to:

determine input data from the touch-sensitive display screen selects one or more of the plurality of digital items;

determine a second proximate computing device; and send stored data associated with the one or more of the plurality of digital items to the second proximate computing device.

20. The non-transitory computer-readable medium of claim 19, wherein the second proximate computing device has a display screen with a different set of display characteristics than the touch-sensitive display screen.

* * * * *